Figure 1:
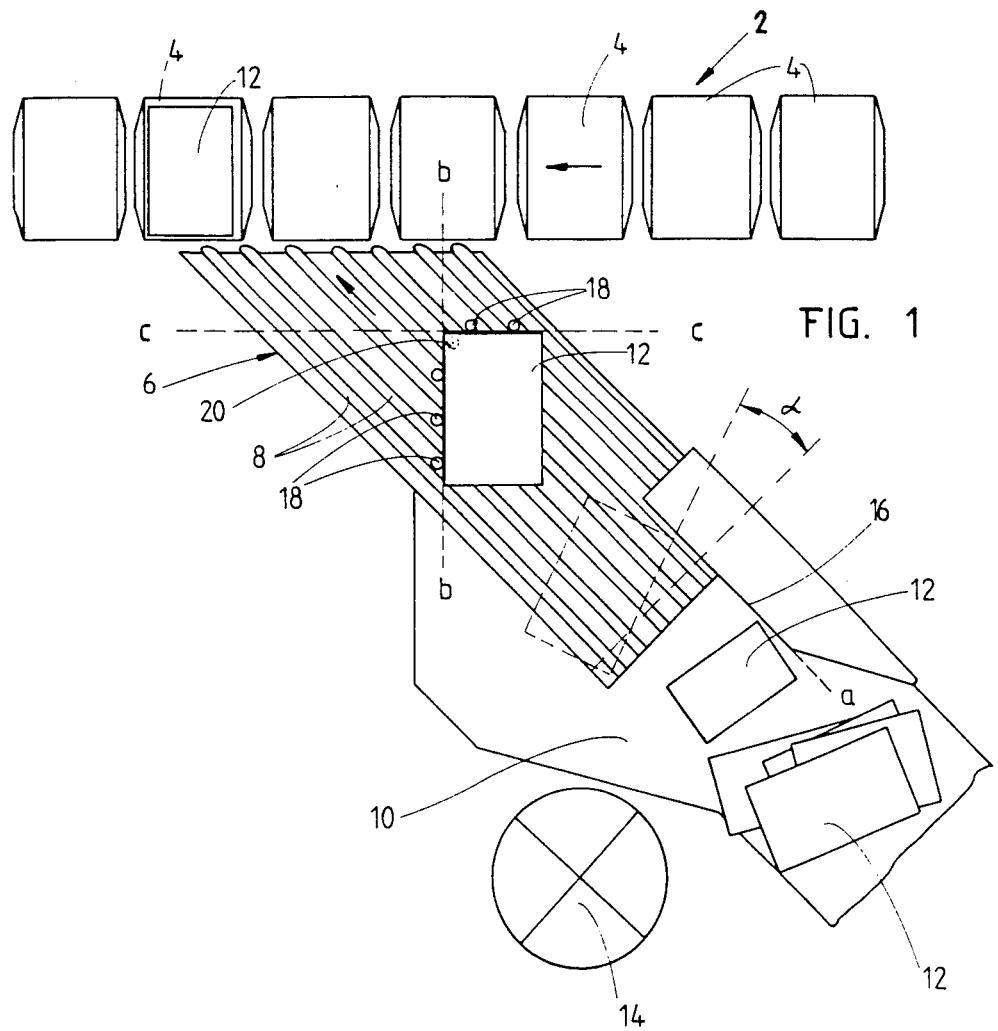

United States Patent [19]

Hartlepp

[11] Patent Number: 4,682,682
[45] Date of Patent: Jul. 28, 1987

[54] FEEDING CONVEYOR FOR FEEDING ARTICLES LATERALLY ONTO ANOTHER CONVEYOR, PARTICULARLY A SORTING CONVEYOR

[75] Inventor: Karl H. Hartlepp, Rønde, Denmark

[73] Assignee: Kosan Crisplant A/S, Aarhus N., Denmark

[21] Appl. No.: 909,923

[22] Filed: Sep. 22, 1986

Related U.S. Application Data

[63] Continuation of Ser. No. 639,405, Aug. 10, 1984, abandoned.

[30] Foreign Application Priority Data

Aug. 11, 1983 [DK] Denmark .............................. 3654-83

[51] Int. Cl.[4] .............................................. B65G 47/24
[52] U.S. Cl. .................................... 198/368; 198/382; 198/434; 198/633; 198/463.4
[58] Field of Search ................ 198/382, 451, 352, 357, 198/358, 368, 434, 443, 444, 463.4, 633, 416

[56] References Cited

U.S. PATENT DOCUMENTS 3,660,077  5/1972  Marshall .............................. 198/416

FOREIGN PATENT DOCUMENTS 0035741  3/1980  Japan .................................. 198/416

Primary Examiner—Joseph E. Valenza
Assistant Examiner—D. Glenn Dayoan
Attorney, Agent, or Firm—Antonelli, Terry & Wands

[57] ABSTRACT

In connection with a feeding conveyor for feeding articles laterally onto a sorter conveyor is mounted a retractable V-shaped stop for the articles as conveyed on the feeding conveyor, whereby these articles are temporarily stopped and concurrently centered towards the top point of the V-stop. Hereby it is achieved that the remaining article transfer distance is well defined such that the transfer of the article to the sorter conveyor, upon retraction of the V-stop, may take place in a well defined manner. When the respective edges or sides of the V-stop are orientated parallelly with and orthogonally to the moving direction of the sorter conveyor, it is achieved, additionally, that a rectangular article as fed to the feeding conveyor with any arbitrary orientation, will be orientated so as to take up a minimum space on the sorter conveyor, whereby the capacity of the latter may kept at a maximum.

5 Claims, 2 Drawing Figures

FEEDING CONVEYOR FOR FEEDING ARTICLES LATERALLY ONTO ANOTHER CONVEYOR, PARTICULARLY A SORTING CONVEYOR

This is a continuation of application Ser. No. 639,405, filed Aug. 10, 1984, now abandoned.

The present invention relates to a feeding conveyor for feeding articles orderly onto another conveyor, particularly a sorting conveyor.

For feeding articles laterally to a sorting conveyor use is normally made of a feeding conveyor as conveying the articles obliquely inwardly and forwardly towards the side of the sorting conveyor, and the feeding conveyor moves with a velocity such that the articles are fed to the sorting conveyor with a velocity component in the moving direction of the sorting conveyor equal to the moving velocity of the latter itself, whereby a well defined positioning of the articles on the sorting conveyor, in the following also called the sorter band, will be ensured.

It may be important that the articles are fed to the sorter band not only with a correct velocity for avoiding sliding on the sorter band, but also at a precise moment of time relative the motion of the sorter band, since it can be secured hereby that the article is fed into a given space between two other articles on the band or onto a selected, free conveyor tray portion of the sorter band, all according to the design thereof. For achieving the required feeding accuracy the articles, upon being manually fed to the feeding conveyor, are normally caused to be successively stopped at or in a predetermined ready-to-feed-position on the feeding conveyor, either by the feeding conveyor being stopped or by the article being moved against a stop. The active feeding of the article onto the sorter band may then be effected by restarting the feeding conveyor or removing the stop at a relevant moment of time.

It is the purpose of the invention to provide a feeding conveyor, by means of which a particularly accurate and advantageous article feeding to the sorting conveyor can be effected.

The invention is based on the recognition that the feeding accuracy of the articles is conditioned not only by a correct timing, but also by a specific location of the article on the feeding conveyor, as viewed in the transverse direction thereof, because an article located near one side of the feeding conveyor will be fed onto the sorter band at a different place thereon, compared with an article located near the other side of the feeding conveyor.

According to the invention the feeding conveyor is provided with an arrangement operable to cause the articles to be centered on this conveyor. The arrangement consists of an angle shaped mechanical stop, which will cause the article on the moving conveyor to seek towards the inner top point of the angular stop, whereby the article will be centered in the transverse direction of the conveyor prior to being released for transfer to the sorter band by the stop being removed.

The angular stop will form a forwardly pointed arrow head on the feeding conveyor, and the sides of the arrow head may advantageously be orientated such that the two sides thereof, respectively are parallel with and perpendicular to the moving direction of the sorter band, owing to the oblique direction of the feeding conveyor towards the sorter band. This feature will account for an extra and quite important advantage, viz. the advantage that all articles of rectangular shape—which is in practice the most common "article" shape—will automatically be turned into an orientation parallel with the sorter band, whereby the effective length of the articles on the band will be less than for an oblique orientation of the articles. Correspondingly, the operator as feeding articles to the feeding conveyor may, in rather uncritical manner, place a rectangular article on the conveyor such that the article, when moved against the angular stop, will automatically get turned so as to have its shorter dimension located, according to desire, in the length or the cross direction of the sorter band, to which the article is thereafter transferred.

Figure 2:
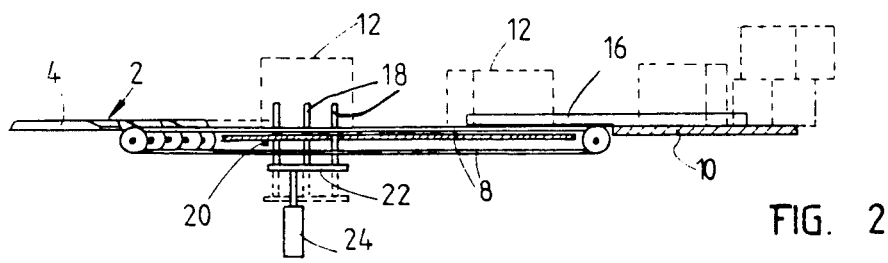

The angular stop may advantageously be constituted by an angle shaped row of vertical fingers or pins, which project upwardly from a common, vertically reciprocal carrier frame member, up through the respective free spaces between parallel, narrow conveyor belts as constituting the feeding conveyor, whereby the stop will be releasable by downward retraction of the carrier frame. Alternatively the angular stop may be constituted by an angular plate member, which is liftable from a position just over the feeding conveyor In the drawing FIG. 1 is a top view of a feeding conveyor according to the invention, and FIG. 2 is a sideview thereof, partly in section.

The sorting conveyor has a sorter band 2 constituted by article trays 4, which may receive articles from the feeding conveyor, designated 6. The conveyor 6 comprises a plurality of parallel endless belts 8 as mounted mutually spaced and extending obliquely forwardly towards the side of the sorter band 2, the belts 8 here passing about individual pulleys close to the side of the sorter band 2. At the opposite, outer end of the feeding conveyor the belts 8 run over a common pulley roller (not shown) located close to a table 10 for receiving articles 12 to be sorted out by means of the sorting conveyor.

An operator 14 pushes the articles 12 successively onto the conveyor 6, here taking care of holding the articles slidingly against a guiding edge or surface 16 as extending along a line a. As indicated in dotted lines an article being handled shall not need to side- or surfacewise engage the guiding edge 16, and strictly spoken the article shall not even have to actually engage the guiding edge 16, when only the outermost part of the article to the right relative the moving direction of the belts 8 is located close to the guiding edge 16.

In the interspaces between the belts 8 is mounted a number of vertical fingers or pins 18, which are secured to a non-illustrated carrier member underneath the belts 8, this carrier member being vertically reciprocally arranged such that it can be lowered and raised in a manner making the totality of the pins 18 a downwardly retractable stop for the articles 12 as conveyed on the belts 8. As illustrated, this stop is angularly shaped insafar as the pins 18 are mounted along mutually orthogonal lines b and c as located, respectively, in the length and cross direction of the sorter conveyor band 2.

It will be readily understood that an article 12 as carried against the stop pins 18 by the belts 8 will be caused to center itself on the feeding conveyor, viz. in being guided generally towards the internal top angle point of the angular stop. Moreover, rectangular articles 12 will hereby be turned, by the continued movement of the belts 8, until the leading edges or surfaces of the article engage the stop pins 18 along the respective lines b and c.

Thus, an article 12 as moved on the conveyor 6 against the stop pins 18 will be temporarily stopped in a position, in which it is centered on the feeding conveyor, whereby the remaining transfer distance from the angular stop to the sorting conveyor will be well defined, and moreover any rectangular article 12 will be automatically turned into a stop position, in which the length of the article as seen in the moving direction of the sorter conveyor is as small as possible, though of course this will depend of the article being orientated with its shorter dimension parallel with or perpendicular to this direction.

Upon having caused the discussed centering and orientation of a supplied article 12 the stop pins 18 can be actuated to release the article for a well defined transfer thereof to the sorter band 2 just by downward retraction of the carrier element of the pins 18 in response to a free sorter tray 4 arriving at the feeding station. In FIG. 2 the said carrier element is designated 22, and a working cylinder for the vertical shifting thereof is designated 24.

It should be mentioned that the guiding edge 16 is preferably located such that the line a. as viewed in the moving direction of the belts 8 will be situated slightly to the right of the top point of the angular stop. A photocell 20 or a corresponding sensor of the presence of a transferable article 12 adjacent the stop pins 18 may be arranged near the same top point.

The angle α as shown in the drawing should be less than 45° in order to ensure that an article 12 by engaging the angular stop will be turned into such a position, in which the article side as determining the angle α is brought to be perpendicular to the moving direction of the sorter band 2. Thus, the operator should only know if for a given article size it is important whether the article is orientated with the shorter dimension thereof parallelly with or perpendicularly to the said moving direction.

What is claimed is:

1. A feeding conveyor for feeding articles laterally onto another conveyor, particularly a sorting conveyor, by a movement obliquely inwardly and forwardly towards the latter conveyor, in an intermediate area of the feeding conveyor there is arranged a generally V-shaped stop means comprising an operationally unitary structure for temporarily stopping as well as centering and lining up of articles in conjunction with the action of said feeding conveyor, said V-shaped stop means being movable towards and retractable away from its stop position as a unit for releasing the centered and lined up article for transfer thereof to the sorting conveyor.

2. A feeding conveyor according to claim 1, in which the V-shaped stop member is constituted by a plurality of stop pins as projecting upwardly, in a downwardly retractable manner, through the spaces between mutually spaced conveyor belts as constituting the feeding conveyor.

3. A feeding conveyor according to claim 1, in which a fixed guiding edge is provided for defining the position of the articles in the transverse direction of the feeding conveyor.

4. A feeding conveyor according to claim 1, in which the opposed sides of the V-stop are located, respectively, parallel with and orthogonal to the longitudinal direction of the sorting conveyor.

5. A method for feeding articles laterally onto another conveyor comprising the steps of
feeding articles on a feeder conveyor by movement obliquely inwardly and forwardly towards the another conveyor,
vertically raising a V-shaped stop means in front of an article on the feeder conveyor,
effecting lining up of the article abutting the V-shaped stop means in a desired orientation by action of the feeder conveyor, while the V-shaped stop means is temporarily held stationary, and
vertically lowering the V-shaped stop means to allow the article to be fed onto the another conveyor in the desired orientation.

* * * * *